United States Patent [19]
Cozens et al.

[11] Patent Number: 5,422,399
[45] Date of Patent: Jun. 6, 1995

[54] RIGID ARTICLE HAVING A STUCCO APPEARANCE MADE FROM A BLEND OF PVC AND CROSSLINKED PVC

[75] Inventors: Ross J. Cozens, North Ridgeville; William S. Greenlee, Avon Lake; Douglas E. Skillicorn, Elyria, all of Ohio

[73] Assignee: The Geon Company, Independence, Ohio

[21] Appl. No.: 84,339

[22] Filed: Jun. 29, 1993

Related U.S. Application Data

[60] Continuation of Ser. No. 871,323, Apr. 20, 1992, abandoned, which is a division of Ser. No. 427,974, Oct. 26, 1989, Pat. No. 5,130,374, which is a continuation of Ser. No. 159,142, Feb. 23, 1988, abandoned.

[51] Int. Cl.⁶ .................. C08L 27/06; C08L 27/08
[52] U.S. Cl. .................... 525/239; 526/344; 526/344.1; 526/344.2; 526/344.3; 428/35.7; 428/500
[58] Field of Search ............ 525/239; 526/344, 344.1, 526/344.2, 344.3; 428/35.7, 500

[56] References Cited

U.S. PATENT DOCUMENTS

| | | | |
|---|---|---|---|
| 3,706,722 | 12/1972 | Nelson | 526/192 |
| 3,796,776 | 3/1974 | Ide et al. | 260/899 |
| 3,988,392 | 10/1976 | Kameda et al. | 525/85 |
| 4,000,216 | 12/1976 | Lang | 525/66 |
| 4,265,276 | 5/1981 | Hatada et al. | 138/177 |
| 4,340,530 | 7/1982 | Higashiguchi et al. | 524/515 |
| 4,458,060 | 7/1984 | Yamane et al. | 526/313 |
| 4,464,513 | 8/1984 | Kishida et al. | 525/227 |
| 4,567,217 | 1/1986 | Yamazaki et al. | 524/296 |
| 4,657,541 | 4/1987 | Ichikawa et al. | 604/408 |
| 4,711,908 | 12/1987 | Hawrylko et al. | 521/56 |
| 4,742,085 | 5/1988 | Cozens et al. | 521/56 |
| 4,757,092 | 7/1988 | Hawrylko | 526/344.2 |
| 4,775,700 | 10/1988 | Cozens | 526/202 |
| 5,130,374 | 7/1992 | Cozens et al. | 525/239 |

FOREIGN PATENT DOCUMENTS

| | | |
|---|---|---|
| 0104433 | 5/1983 | European Pat. Off. |
| 44-25897 | 10/1969 | Japan |
| 53-21039 | 6/1978 | Japan |
| 55-78045 | 6/1980 | Japan |
| 56-166022 | 12/1981 | Japan |
| 61-62546 | 3/1986 | Japan |

Primary Examiner—Melvyn I. Marquis
Assistant Examiner—Randy Gulakowski
Attorney, Agent, or Firm—Joe A. Powell; Miles B. Dearth

[57] ABSTRACT

Rigid thermoplastic articles are disclosed which have reduced surface gloss. The reduced gloss is achieved by the use of a mixture of polymers having different viscoelastic properties. The preferred embodiment is a mixture of PVC and crosslinked PVC.

3 Claims, 1 Drawing Sheet

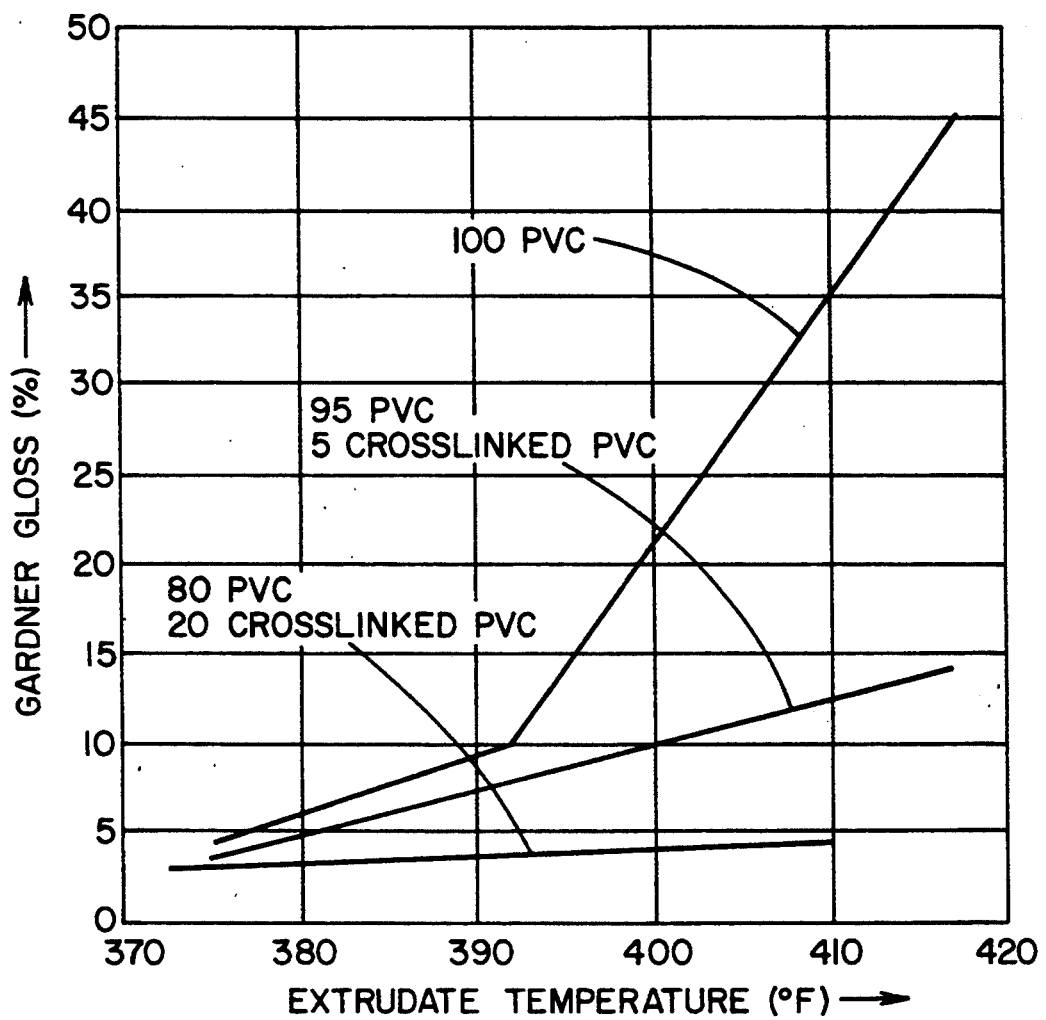

RIGID ARTICLE HAVING A STUCCO APPEARANCE MADE FROM A BLEND OF PVC AND CROSSLINKED PVC

This is a continuation of application Ser. No. 07/871,323, filed Apr. 20, 1992, now abandoned, which a division of application Ser. No. 07/427,974, filed on Oct. 26, 1989 now U.S. Pat. No. 5,130,374 which is a continuation of Ser. No. 07/159,142 filed on Feb. 23, 1988, now abandoned.

CROSS-REFERENCES TO RELATED APPLICATIONS

This application is related to application filed as Ser. No. 099,818, with a filing date of Sep. 21, 1987, filed in the names of Ross James Cozens and William Samuel Greenlee. This application is also related to copending application filed as Ser. No. 038,087, with a filing date of Apr. 14, 1987, filed in the name of Ross James Cozens.

BACKGROUND OF THE INVENTION

When forming rigid plastics, such as polyvinyl chloride (PVC), by extruding, calendering or molding, the control of gloss is very important. Small changes in the forming temperature can greatly change the gloss of the surface of the article being produced. This is especially the case for extruded articles. The control of gloss is critical in applications such as house siding, where if different pieces of siding have different gloss levels, then the siding will not be as attractive on the house. Gloss levels can be lowered by reducing the extrusion temperatures. However, lower extrusion temperatures can result in poor physical properties if the resin has not properly fused. Also, low extrusion temperatures give rough surfaces on the extrudate.

To achieve a matte surface or to merely control gloss in extruded, calendered or molded rigid thermoplastics it is the accepted practice to add abrasive fillers to the composition. Abrasive fillers such as aluminum silicate, and large particle size calcium carbonate are added to the rigid compositions to give a matte surface. These abrasive fillers are detrimental to physical properties of the compositions and they are detrimental to the processing equipment. The abrasive fillers tend to cause excessive premature wear on extrusion equipment. These abrasive fillers are usually relatively large particles which are incompatible with the polymer network of the composition.

It would be desirable to have rigid thermoplastic compositions which could be formed into articles having a matte surface. It would also be desirable if the matte surface could be achieved without the use of abrasive fillers, and with an additive which is compatible with the polymer network of the composition. Good reproducibility of matte surface along with a broader latitude in processing temperature would also be highly desirable.

SUMMARY OF THE INVENTION

It is an object of this invention to provide rigid thermoplastic compositions which when formed, such as by extrusion, calendering or molding, will have a matte finish and preferably a smooth matte finish.

It is a further object of this invention to provide PVC articles such as pipe, house siding, bottles, and injection molded articles which have low gloss and preferably a smooth surface.

It is an additional objective to provide extruded PVC articles having a stucco appearance.

It is an additional objective of this invention to produce articles which have good reproducibility of matte surface over a broad range of processing temperature.

These and other objects which will become evident from the following disclosure are accomplished by the use of a rigid thermoplastic composition comprising a first polymer and a second polymer, wherein said first polymer and said second polymer have different viscoelastic properties. Preferably, the first polymer is PVC and the second polymer is crosslinked PVC. More preferably, for extruded articles the second polymer is a highly friable PVC. The most preferred embodiment for extruded articles is when the second polymer is a skinless crosslinked PVC. When the composition is being used to make an article by a molding operation which exposes the composition to high shear, then it is preferred to use a less friable polymer as the second polymer.

BRIEF DESCRIPTION OF THE DRAWING

The Figure is a graph showing that crosslinked PVC in a rigid PVC composition decreases gloss and also makes the extrudate surface gloss less sensitive to extrusion temperature.

DETAILED DESCRIPTION OF THE INVENTION

The polymeric materials used to produce the articles of this invention include polymeric materials such as polyvinyl chloride and copolymers of vinyl chloride and other copolymerizable monomers, polyester, polycarbonate, polystyrene, polymethyl methacrylate and the like. The term polymer includes oligomers, copolymers, terpolymers or higher order polymers of materials normally referred to as thermoplastic or elastomeric and blends thereof. The invention will be described in terms of a rigid polyvinyl chloride article.

The rigid matte surface articles of this invention include articles such as gutters, house siding, pipe, bottles, calendered sheet, injection molded articles, and the like.

The compositions of this invention are rigid. Rigid compositions are those which contain less than about 10 parts by weight of plasticizer per 100 parts by weight of polymer, other than the stabilizers, lubricants and processing aids. Preferably the compositions contain less than about 5 parts by weight of plasticizer, more preferably there is substantially no plasticizer present in the rigid compositions of this invention. The term plasticizer includes materials such as oil extenders and other materials whose purpose is to soften the formed composition.

The compositions of this invention must contain at least two polymeric components, that is a first polymer component and a second polymer component. The first and second polymer components must have different viscoelastic properties.

One method to achieve different viscoelastic properties is to crosslink a polymer, thus making the polymer more rubber-like. Therefore, the first polymer component could be polyvinyl chloride while the second polymer component could be crosslinked polyvinyl chloride. When polyvinyl chloride is crosslinked, its viscoelastic properties are substantially changed. The viscoelastic properties at a given temperature can also be changed in polyvinyl chloride by increasing the molecular weight. Molecular weight is commonly expressed as inherent viscosity (IV). Inherent viscosity is measured according to ASTM Procedure D-1243. PVC polymers having an IV greater than 1.02, preferably greater than 1.4, more preferably greater than 1.8, are materials where the high molecular weight, and thus high crystallinity, exhibit behavior similar to crosslinked PVC at temperatures below which the crystals melt. The higher IV material tends to be more crystalline and the crystals act like crosslinks as long as they are maintained below their melting point.

The first and second polymer components may both be present as one resin. For example, a core/shell overpolymer could be formed by making a crosslinked PVC core and then overpolymerizing with vinyl chloride to form a crosslinked PVC core with a non-crosslinked PVC shell. In this instance, both the first and second polymer would be present in the same resin particle. Crosslinked PVC resin particles often contain both crosslinked PVC and uncrosslinked PVC. Depending on the selection of the crosslinking agent, the crosslinking agent can be completely reacted with vinyl chloride during the early part of the polymerization, in which case the following part of the polymerization would be producing homopolymer PVC that is not crosslinked.

The following Table I, although not exhaustive, represents various preferred possible combinations of polymers to give first and second polymer components with desired viscoelastic properties. Any of the first polymers could be mixed with any second polymer where the polymers are compatible. Compatibility may be evidenced by the ability of the polymers to be blended together and the blend is stable after long term storage or use as is well understood in the art. Compatibility is required for optimum physical properties of the formed composition.

TABLE I

| Composition No. | First Polymer | Second Polymer |
|---|---|---|
| 1. | Polyvinyl chloride | Crosslinked polyvinyl chloride, very high molecular weight polyvinyl chloride, crosslinked polyester |
| 2. | Polyester | Crosslinked polyvinyl chloride, crosslinked polyester |
| 3. | Polystyrene | Crosslinked polystyrene |
| 4. | Polycarbonate | Crosslinked polycarbonate |
| 5. | Polymethylmethacrylate | Crosslinked polymethylmethacrylate |
| 6. | Poly 4-methyl-pentene-1 | Crosslinked poly 4-methyl-pentene-1 |
| 7. | Nylon | Crosslinked nylon |
| 8. | Polyarylate | Crosslinked polyarylate |
| 9. | Polysulfone | Crosslinked polysulfone |
| 10. | Polyurethane | Crosslinked polyurethane |
| 11. | Silicone | Crosslinked silicone |
| 12. | Vinyl chloride copolymers | Crosslinked polyvinyl chloride, crosslinked vinyl chloride copolymers |
| 13. | Lightly crosslinked polyvinyl chloride | Heavily crosslinked polyvinyl chloride |
| 14. | Cellulose acetate | Crosslinked cellulose acetate |
| 15. | Cellulose acetate butyrate | Crosslinked cellulose acetate butyrate |
| 16. | Ionomer resin | Crosslinked ionomer resin |
| 17. | Styrene butadiene thermoplastic elastomer | Crosslinked styrene butadiene thermoplastic elastomer |
| 18. | Styrene-acrylonitrile copolymer | Crosslinked styrene-acrylonitrile copolymer |
| 19. | Ethylene ethyl acrylate copolymer | Crosslinked ethylene ethyl acrylate copolymer |
| 20. | Ethylene methyl acrylate copolymer | Crosslinked ethylene methyl acrylate copolymer |
| 21. | Polyethylene | Crosslinked polyethylene |
| 22. | Polypropylene | Crosslinked polypropylene |
| 23. | Acrylonitrile-butadiene-styrene (copolymer) | Crosslinked acrylonitrile-butadiene-styrene |
| 24. | Polystyrene/polyphenylene oxide blends | Crosslinked polystyrene, crosslinked polyphenylene oxide |
| 25. | High impact polystyrene | Crosslinked high impact polystyrene, crosslinked polystyrene |
| 26. | Polyphenylene sulfide | Crosslinked polyphenylene sulfide |

The invention will be further described with the preferred embodiment of a rigid polyvinyl chloride (PVC) article made with a mixture of PVC polymer and crosslinked PVC polymer.

PVC polymers as used in this invention means polyvinyl chloride homopolymers as well as vinyl chloride polymerized with up to 50%, preferably up to 20%, by weight of one or more other monomer(s) which will give a rigid copolymer with vinyl chloride. Suitable comonomers that may be used to give a copolymer includes esters of acrylic acid, for example, methyl acrylate, ethyl acrylate, butyl acrylate, octyl acrylate, cyanoethyl acrylate, and the like; vinyl acetate; esters of methacrylic acid, such as methyl methacrylate, ethyl methacrylate, butyl methacrylate, and the like; styrene and styrene derivatives including α-methyl styrene, vinyl toluene, chlorostyrene; vinyl naphthalene; diolefins including butadiene, isoprene, chloroprene, and the like; and mixtures of any of these types of monomers and other olefinic monomers copolymerizable therewith; and other monomers known to those skilled in the art which will give rigid copolymers with vinyl chloride. The amount of comonomer that can be polymerized with vinyl chloride to give a rigid copolymer is a function of the choice of comonomer, as is well understood by those skilled in the art. Some of the comonomers listed herein will give undesirable semi-rigid copolymers if the comonomer is used at levels greater than about 3%. Preferably, the polyvinyl chloride polymer of this invention is a polyvinyl chloride homopolymer.

The PVC polymer of this invention may be produced by any of the known polymerization processes such as mass, suspension, solution or emulsion. Mass and suspension are the preferred processes to produce the PVC polymer with suspension being the most preferred process. The process to be described is a suspension process. When using the suspension process, suitable dispersing agents or suspending agents, such as known in the art, may be used. Examples of suitable dispersants are partially hydrolyzed polyvinyl alcohol, cellulose ethers, starch, gelatin, and the like. The level of dispersant used will be less than about 2.0 parts by weight, preferably less than about 0.5 part by weight per 100 parts by weight of monomer. Excellent results are obtained with from 0.05 to 0.3 part by weight of dispersant per 100 parts by weight of monomer.

The polymerization is initiated with a free radical catalyst. The monomer-soluble or oil-soluble catalysts that may be used in the polymerization process to produce the polyvinyl chloride polymer used in this invention are the alkanoyl, aroyl, alkaroyl, and aralkanoyl diperoxides and monohydroperoxides, azo compounds, peroxy ester, percarbonates, and other free radical type catalysts. As examples of such catalysts, there may be named benzoyl peroxide, lauryl peroxide, diacetyl peroxide, cumene hydroperoxides, methyl ethyl ketone peroxide, diisopropylbenzene hydroperoxide, 2,4-dichlorobenzoyl peroxide, naphthoyl peroxide, t-butyl perbenzoate, di-t-butyl perphthalate, isopropyl percarbonate, acetyl cyclohexane sulfonyl peroxide, disecondary butyl peroxydicarbonate, 5-butyl peroxyneodecanoate, di-normal propyl peroxydicarbonate, azobisisobutyronitrile, $\alpha,\alpha'$-azodiisobutyrate, 2,2'-azo-bis-(2,4-dimethyl valeronitrile), and many others. The particular free radical catalyst employed will depend upon the monomeric material(s) being polymerized, the molecular weight and color requirements of the polymer, the temperature of polymerization, etc. Insofar as the amount of catalyst employed is concerned, it has been found that an amount in the range of about 0.005 parts by weight to about 1.00 parts by weight, based on 100 parts by weight of the monomer or monomers being polymerized, is satisfactory. However, it is preferred to employ an amount of catalyst in the range of about 0.01 part by weight to about 0.20 part by weight based on 100 parts by weight of monomer(s).

The preferred suspension polymerization process to produce the PVC polymers of this invention may be carried out at any temperature which is normal for the monomeric material to be polymerized. Preferably, a temperature in the range of about 0° C. to about 100° C. is employed, more preferably from about 40° C. to about 85° C. In order to facilitate temperature control during the polymerization process, the reaction medium is kept in contact with cooling surfaces cooled by water, brine, evaporation, etc. This is accomplished by employing a jacketed polymerization reactor wherein the cooling materials are circulated through the jacket throughout the polymerization reaction. This cooling is necessary since most all of the polymerization reactions are exothermic in nature. It is understood, of course, that a heating medium can be circulated through the jacket, if necessary.

The second polymer that is used in the preferred embodiment of this invention is a crosslinked PVC polymer. The term PVC polymer as used to describe the crosslinked PVC polymer has the same meaning as the above description of PVC polymer for the first polymer which includes copolymers with vinyl chloride as described above. Preferably, the second polymer is a crosslinked PVC homopolymer. The term polyvinyl chloride homopolymer as used to describe the second polymer in this specification includes the polymerized vinyl chloride as well as the small amount of crosslinking agents. Technically, the crosslinked PVC of this invention, if made by use of chemical crosslinking agents, will always be a copolymer, because the crosslinking agent copolymerizes with the vinyl chloride. However, the amount of crosslinking agent is so small that in this specification the crosslinked PVC having only vinyl chloride and crosslinking agent as monomers will be referred to as a crosslinked PVC homopolymer. The invention will be described in terms of a crosslinked polyvinyl chloride homopolymer as the preferred embodiment for the second polymer of this invention.

In addition to chemically crosslinked PVC which is the preferred type of crosslinked PVC, other types of crosslinked PVC could be used. For example, the PVC could be crosslinked by radiation, UV light, heat, or post polymerization crosslinked using peroxides. The term crosslinked PVC as used in this specification is intended to include all types of crosslinked PVC, regardless of how the crosslinking is achieved.

The preferred chemical crosslinking agents are those materials which are soluble in the vinyl monomer. The reactivity ratio of the crosslinking agent should be such that it prefers to add to the vinyl monomer rather than to add to itself. The rate constants (k) of the various reactions involved can be expressed as:

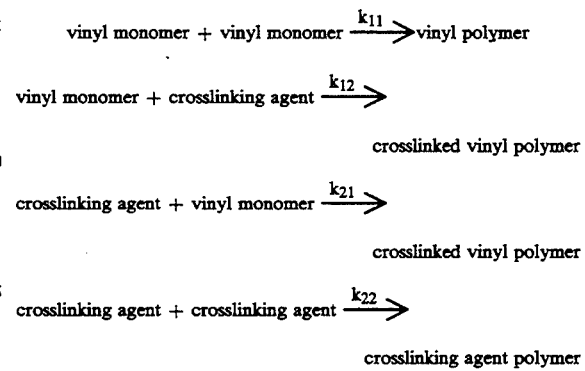

The monomer reactivity ratio of vinyl monomer ($R_1$) can be expressed as $$R_1 = \frac{K_{11}}{K_{22}}.$$

The monomer reactivity ratio of the crosslinking agent ($R_2$) can be expressed as $$R_2 = \frac{K_{22}}{K_{21}}.$$

Ideally the product of $R_1$ and $R_2$ would be equal to 1 ($R_1 \times R_2 = 1$).

The crosslinking agents preferably should be completely reacted before the normal termination of the polymerization, so as not to have crosslinking monomer present as residual monomer in the vinyl polymer. Vinyl chloride polymerizations are normally run to a % conversion of monomer to polymer of from about 50% to 90%, preferably from about 65% to about 80%. The conversions can of course be higher or lower depending on the desired properties of the resin.

The crosslinking agents which are suitable to produce the crosslinked PVC used in this invention include, for example, diallyl phthalates such as diallyl phthalate, diallyl isophthalate, diallyl terephthalate, etc.; other esters such as diallyl maleate, diallyl fumarate, diallyl itaconate, diallyl adipate, diallyl azelate, diallyl sebacate, triallylcyanurate, triallyl isocyanurate, triallyl trimellitate, etc.; vinyl ethers such as diallyl ether, ethylene glycol divinyl ether, n-butanediol divinyl ether, octadecane divinyl ether, etc; esters such as di(meth)acryl esters of polyhydric alcohols such as ethylene glycol dimethacrylate, diethylene glycol dimethacrylate, diethylene glycol diacrylate, triethylene glycol dimethacrylate, etc.; tri(meth)acryl esters of polyhydric alcohols such as trimethylolpropane trimethacrylate, trimethylolethane trimethacrylate, trimethylolpropane triacrylate, trimethylolmethane triacrylate, tetramethylolmethane triacrylate, etc; polyfunctional compounds such as bismethacryloyloxyethylene phthalate, 1,3,5-triacryloylhexahydrotriazine, etc. A mixture of more than one crosslinking agent may be used. Diallyl phthalate is the most preferred crosslinker for making the crosslinked PVC polymer used in this invention.

The crosslinking agent may be added to the polymerization medium in any manner known to those skilled in the art; such as premixing with the vinyl monomer before charging, charging directly into the polymerization medium or metering into the reaction during the polymerization. The preferred method is to first premix the crosslinking agent with the vinyl monomer before charging to the reaction vessel. If a mass polymerization is used to produce the crosslinked PVC polymer, then the crosslinking agent could be added at any location in the process such as the prepolymerizer or the autoclave, preferably the crosslinking agent should be added in the prepolymerizer.

The amount of crosslinking agent used to make the crosslinked PVC polymer used in this invention is from about 0.05 part by weight to about 5.0 parts by weight, preferably about 0.15 part to about 1.0 part by weight, more preferably about 0.25 part to about 0.6 part by weight per 100 parts by weight of vinyl monomer. The amount used varies with the degree of crosslinking desired.

If one elects to use polymers other than PVC to produce rigid matte surface articles, then the selection of crosslinking agent would depend upon the relative reactivity rates of the monomer being polymerized and the crosslinking agent. The reactivity ratios of various monomers are published in reference books, and well known to those skilled in the art.

A critical feature of the present invention is that the first PVC polymer and the second PVC polymer have dissimilar viscoelastic properties.

The method used for determining viscoelastic properties of the polymers used in this invention involves subjecting a disk-shaped sample to very small deformation (less than 1% strain) in a cyclic fashion using a Rheometrics Mechanical Spectrometer equipped with oscillating parallel plates. During deformation of the sample, a certain amount of energy is lost due to molecular segmental motions. The remaining energy is stored by elastic mechanisms. These two types of behavior are simultaneously measured during testing and are reflected in the magnitudes of the loss modulus (G") and storage or elastic modulus (G'). Also measured is the complex viscosity (n*), which is analogous to the steady state shear viscosity as might be measured by a capillary rheometer.

Complex viscosity is an indication of molecular weight. Intrinsic viscosity (IV) is normally the method of expressing the molecular weight of a PVC resin. However, with crosslinked resins the resin is not completely soluble, thus the IV cannot be accurately determined. Therefore, the molecular weights of the resins of this invention are expressed as complex viscosity, with the units being poise. The complex viscosity is measured at 210° C. The crosslinked PVC polymers suitable for use as the second polymer component of this invention have a complex viscosity of from about $0.9 \times 10^5$ poise to about $100.0 \times 10^5$ poise, preferably about $4.0 \times 10^5$ poise to about $60.0 \times 10^5$ poise. In terms of behavior, a complex viscosity of $0.9 \times 10^5$ poise corresponds to an IV of about 0.8, and a complex viscosity of $60.0 \times 10^5$ poise corresponds to an IV of about 1.5.

Another important viscoelastic property of the PVC resins of this invention is the tan δ, which is the ratio of the loss modulus (G") to the energy storage modulus (G'). The tan δ can be expressed by the formula:

$$\text{Tan } \delta = \frac{G''}{G'}.$$

Tan δ is an indication of the amount of long chain branching (crosslinking) present in the resin. A PVC homopolymer with no crosslinking would have a tan δ of about 1.0. As crosslinking occurs, the tan δ gets smaller. The tan δ of the crosslinked PVC polymers of this invention are less than 1.0, preferably from about 0.1 to about 0.5, more preferably from about 0.2 to about 0.4. The tan δ is measured at 210° C.

The preferred compositions of this invention contain both the non-crosslinked PVC polymer and the crosslinked PVC polymer. The compositions contain a total of 100 parts by weight of PVC polymer, crosslinked and non-crosslinked. For rigid end use applications, such as siding, injection molding and bottles, the non-crosslinked PVC polymer is preferably present at a level of from about 60 to about 99.5 parts by weight and the crosslinked PVC polymer is present at from about 0.5 to about 40 parts by weight. More preferably, the ratio of non-crosslinked to crosslinked PVC is about 80:20 to about 99:1. The degree of crosslinking (tan δ) will somewhat affect the amount of crosslinked PVC needed to give a desired gloss reduction. When a PVC with a higher degree of crosslinking is used, then less of an amount is needed to give the article the desired gloss reduction. Likewise, if a very lightly crosslinked PVC polymer is used, then a larger amount would be required to give the same amount of gloss reduction.

The compositions will normally contain other ingredients such as stabilizers, lubricants, processing aids, and impact modifiers, all of which are to enhance the processing and performance of the composition in its end use application. Small amounts of plasticizers may be used but for the rigid compositions of this invention, the plasticizer must be less than about 10 parts by weight per 100 parts by weight of PVC. Preferably, the level of plasticizer is less than 5 parts by weight per 100 parts by weight of PVC. More preferably, the compositions are substantially free of plasticizers. Pigments and fillers, such as $TiO_2$ and $CaCO_3$, may also be used to improve performance, reduce cost or color the compositions. Small amounts of other additives normally found in PVC compositions can be used such as smoke and flame retardants and the like.

The invention was described above in terms of a crosslinked PVC with a non-crosslinked PVC. One could use a lightly crosslinked PVC with a heavy crosslinked PVC. For example, a lightly crosslinked PVC with a tan δ greater than about 0.7, preferably greater than 0.9, could be used with a heavily crosslinked PVC with a tan δ less than about 0.5, preferably less than about 0.4. The important feature being that they possess different viscoelastic properties. Tan δ differences greater than about 0.1, preferably about 0.3, more preferably about 0.5, will cause the polymers to have sufficiently different viscoelastic properties to achieve matte surface. One could also use a higher molecular weight PVC with a low molecular weight polyvinyl chloride to get matte finish rigid articles. When mixing two PVC polymers having different molecular weights to obtain a matte finish article, the IV differences between the two PVC polymers should be at least 0.4, preferably 0.5 and more preferably the difference should be 0.8. Excellent results have been obtained when a 0.92 IV PVC is mixed with a 2.0 IV PVC. The high crystallinity of the high molecular weight PVC acts like crosslinks until the crystals melt. For PVC with an IV of 2.0, the melting point of the crystals is well above the processing temperatures. A crosslinked PVC generally offers much more practical advantage over high IV PVC because the processing temperature range is not as critical as with high molecular weight (high IV) PVC.

The article being formed with the compositions of this invention will also dictate the friability of the crosslinked PVC resin which is preferred. For house siding the crosslinked PVC resin should have good friability, whereas a less friable crosslinked PVC is preferred for use in injection molding operations which produce high shear in the composition during processing. The preferred degree of friability to use is dependent upon the shear applied to the individual resin particles. For example, when the matrix is a softer composition, such as if a low molecular weight (low IV) PVC polymer was used as the first polymer, then less shear would be applied to the resin particle than if the matrix was a stiffer composition such as would be obtained by the use of a high molecular weight resin.

The friability value of a resin is an indication of the relative ease with which grains break down into agglomerates and finally to primary particles. One method to test PVC resin for friability is to place a given amount of resin in a mortar and grind the resin with a pestle. The better the friability, the easier the resin particles will break apart. The friability is then subjectively graded on a scale of from 0 to 5, with 0 being very friable and equivalent to the best known PVC for friability. A level of 5 is equivalent to a general purpose flexible grade resin. Values between 0 and 5 are rated as to how they compare with reference standards which are blends of a 0 value resin and a 5 value resin. For extrusion applications, the crosslinked PVC resins used in the compositions of this invention have a friability value of about 2 or less, preferably they have a friability value of 1 to less, and more preferably they have a friability value of 0. For injection molding applications, the crosslinked PVC resins have a friability value of from about 1 to about 5. The selection of the proper resin, that is one having the correct degree of friability, is determined by the amount of shear the resin particles are exposed to during processing and can be readily determined by simple experimentation for a given process, as is well understood by those skilled in the art.

For reference, make up standards using blends of Geon ® 92 (a low skin spherical PVC resin produced by B. F. Goodrich according to the process of U.S. Pat. No. 3,706,722) and well known for its excellent friability and Geone ® 30 (a non-skinless, general purpose flexible grade PVC resin produced and sold by B. F. Goodrich) as follows:

Reference Standard "0" is a mix of Geon 92: 100 parts and Geon 30: 0 parts.
Reference Standard "1" is a mix of Geon 92: 80 parts and Geon 30: 20 parts.
Reference Standard "2" is a mix of Geon 92: 60 parts and Geon 30: 40 parts.
Reference Standard "3" is a mix of Geon 92: 40 parts and Geon 30: 60 parts.
Reference Standard "4" is a mix of Geon 92: 20 parts and Geon 30: 80 parts.
Reference Standard "5" is a mix of Geon 92: 0 parts and Geon 30: 100 parts.

Compare the friability of the resin tested to the friability of the reference standards. Choose the standard which most closely corresponds to the test resin and report that standard as the friability of the test resin.

As mentioned above, for extrusions and calendering applications, the crosslinked resins used in the compositions of this invention should be highly friable. An excellent choice for the highly friable crosslinked PVC resin is a porous skinless crosslinked PVC resin. The preferred porous skinless crosslinked PVC resin particles can be characterized by more than 90% by weight of said resin particles having the following features:

(a) said particles are skinless as evidenced by an absence of a substantially continuous pericellular membrane;

(b) a complex viscosity of from about $0.9 \times 10^5$ poise to about $100.0 \times 10^5$ poise, preferably about $1.0 \times 10^5$ to about $100.0 \times 10^5$, more preferably about $4.0 \times 10^5$ to about $60.0 \times 10^5$;

(c) a tan δ less than 1.0, preferably from about 0.1 to about 0.95, more preferably from about 0.3 to about 0.7;

(d) a mercury porosity of from about 0.1 cc/g to about 0.8 cc/g, preferably from about 0.3 cc/g to about 0.5 cc/g;

(e) an agglomerated non-spherical shape having a shape factor less than about 0.85, preferably less than about 0.83, more preferably less than about 0.80;

(f) a weight average particle size of from about 70 microns to about 1000 microns, preferably from about 100 microns to about 250 microns;

(g) a friability less than about 2, preferably less than 1, more preferably 0;

(h) a powder mix time of less than about 400 seconds, preferably less than 300 seconds, more preferably less than 250 seconds;

(i) the surface area of said particles is greater than about 20% PVC, preferably greater than about 50%, more preferably greater than about 60% as measured by ESCA.

The skinless crosslinked resin particles may be produced by any one of many processes such as an agitated aqueous suspension process, which is the preferred process. They may also be produced by a mass or bulk polymerization process, where polymerization occurs in the substantial absence of water and surfactants. A mass process is described in U.S. Pat. No. 3,522,227. The mass process produces PVC which is substantially skinless, since there are no surfactants present. When using the mass process, lower conversion reactions will result in a more friable resin particle. Mass process conversions of monomer to polymer in conventional mass polymerization processes should be less than about 65% to obtain highly friable particles.

In the mass process, vinyl chloride is polymerized in mass using a two step process in the first of which agitation of high turbulence is used and in the second very mild agitation, usually related only to the maintenance of uniform temperature in the reaction mass. In the first high speed step, the polymerization is carried to 7 to 15 percent completion, preferably about 10 percent. The vessel contents are then transferred to the second vessel for completion of the polymerization to the desired degree of conversion. The first stage is normally referred to as a prepolymerizer. The crosslinking agent would be added in the prepolymerizer vessel. Of course one vessel could be used for the mass polymerization, but two vessels are preferred.

A phase inversion process may also be used to produce the highly friable crosslinked skinless resins used in this invention. Such a phase inversion process is disclosed in U.S. Pat. No. 3,706,722. In the phase inversion process, the monomer is the continuous phase during the early part of the polymerization and after about 10% conversion additional water is added such as to make the water the continuous phase and the monomer the discontinuous phase. This process in essence runs a mass type polymerization up to about 10% conversion and then inverts to a suspension type polymerization.

The preferred process used to produce the friable skinless crosslinked PVC resin particles used in this invention is an agitated aqueous suspension process. In the process, water is the polymerization medium and a vinyl monomer to water ratio in the range of about 1.0:1.0 to 1.0:10.0 is satisfactory. Preferably, a ratio in the range of about 1.0:1.0 to 1.0:4.0 is employed.

An important feature of the preferred process to prepare the preferred friable skinless crosslinked PVC resin particles used in this invention is the dispersant system that is employed in the polymerization reaction for the purpose of stabilizing the dispersed monomer droplets. A colloidally unstable system will result in what is known as a solid charge, that is, the monomer droplets will agglomerate into large chunks which are unsuitable for use in normal PVC applications. A dispersant system which will not allow any agglomeration of monomer droplets will result in spherical particles. Such a process to produce spherical particles is described in U.S. Pat. No. 4,603,151. To obtain the preferred agglomerated crosslinked skinless particle used in this invention requires a delicate balance of having a few of the monomer droplets agglomerate but not excessive agglomeration such as to result in excessively large particles. An important component of this process is an ion sensitive dispersant which will thicken water. Examples of such thickeners and how they are used are disclosed in U.S. Pat. No. 3,620,988. The ion sensitive dispersants which will thicken water are usually high molecular weight dispersants or crosslinked dispersants which will thicken water at concentrations of less than 2% in water, preferably less than 0.2%, and more preferably less than 0.1% concentration in water. Suitable ion sensitive thickening dispersants include crosslinked polyacrylic acid polymers, crosslinked ethylene malic anhydride polymers, high molecular weight uncrosslinked polyacrylic acid polymers and ethylene malic anhydride polymers, and the like. The preferred thickener is a substantially unneutralized water insoluble crosslinked interpolymer of acrylic acid.

The amount of the water-insoluble substantially unneutralized crosslinked interpolymer useful as an ion sensitive dispersant, in the process of making the friable crosslinked resins used in this invention, will vary in the range of about 0.01 parts by weight to about 0.1 parts by weight, based on 100 parts by weight of the monomer or monomers being polymerized. Preferably, the amount used will be in the range of about 0.02 parts by weight to about 0.06 parts by weight per 100 parts by weight of monomer or monomers being polymerized.

In the process to make the preferred friable crosslinked resins of this invention, other secondary dispersants are preferably employed, along with the ion sensitive dispersant. Dispersants which tend to form a skin on the resin particles such as methyl cellulose and high hydrolysis (above 70%) polyvinyl acetate should be avoided. The secondary dispersants should be monomer soluble and not fully soluble in water. For PVA secondary dispersants, the higher the % hydrolysis, the more water soluble the dispersant. For example, 30% hydrolyzed PVA is monomer soluble and not water soluble, 55% hydrolyzed PVA is very soluble in the vinyl monomer but is also partially soluble in water. 72.5% hydrolyzed PVA is fully water soluble and therefore not acceptable. The fully water soluble dispersants will form a skin on the polymer particle. Oil-soluble non-polyethylene oxide containing secondary dispersants are suitable. Suitable non-polyethylene oxide containing secondary dispersants are those compounds from the sorbitan ester family or the glycerol ester or polyglycerol ester families, as well as the low hydrolysis (less than 70%, preferably less than 60%, and more preferably less than about 55%) polyvinyl acetates, which do not contain polyethylene oxide segments. As examples of such dispersants, there may be named sorbitan trioleate, sorbitan tristearate, sorbitan monooleate, sorbitan monopalmitate, glycerol monooleate, glycerol monostearate, triglycerol monooleate, 50% hydrolyzed polyvinyl acetate, and the like. A mixture of more than one of these dispersants may be used. The function of the secondary dispersants is to increase the porosity of the polymer particles and to increase the colloidal stability of the polymerization mixture. The non-polyethylene oxide containing dispersant is used at a level of from about 0.005 part by weight to about 1.0 part by weight per 100 parts by weight of monomer, preferably from about 0.1 part by weight to about 0.4 part by weight per 100 parts by weight of monomer. More than one secondary dispersant may be used in this invention to achieve the secondary dispersant level. The polymerization is initiated with a free radical catalyst the same as was described earlier for PVC polymerization.

The suspension polymerization process to produce the friable crosslinked PVC used in this invention may be carried out at any temperature which is normal for the monomeric material to be polymerized. Preferably, a temperature in the range of about 0° C. to about 100° C. is employed, more preferably from about 40° C. to about 80° C.

The preferred process to produce friable skinless crosslinked resins of this invention involves using an ionic material to desorb the primary dispersant off the resin. Suitable ionic materials are bases which will neutralize the polyacrylic acid primary dispersant and form a salt. Preferably, the ionic material is a monovalent inorganic or organic base such as amines, sodium hydroxide, ammonium hydroxide, potassium hydroxide, lithium hydroxide, and the like. The most preferred ionic material is sodium hydroxide. Divalent and trivalent materials can crosslink the polyacrylic acid primary dispersant and would therefore not normally be chosen as the ionic material. The preferred embodiment will be described in terms of using sodium hydroxide as the ionic material. The primary dispersant protects the monomer droplets at the very early stages of polymerization. Before the primary dispersant can graft polymerize with the vinyl chloride, NaOH is added to the polymerization medium. The ion sensitive primary dispersant will then swell in size and desorb off the droplets. Protection of the droplet is accomplished after this point by the increased size of the primary dispersant. The NaOH must be added early in the polymerization, usually from 0.5% to 5.0% conversion of monomer to polymer. If the NaOH is added at the beginning or before about 0.5% conversion, the primary dispersant will be desorbed off the droplet too early and could result in an unstable suspension. Preferably the NaOH is added at from 1% to 3% conversion, more preferably 1% to 2% conversion. Since the primary dispersant is desorbed from the droplet and polymerization is continued without a primary dispersant on the particle, the resulting resin is essentially skin-free. Of course, some primary dispersant can become attached to the resin particle without departing from this invention but there cannot be a continuous pericellular membrane present as there is in normal suspension PVC resin.

The amount of NaOH typically added is an amount sufficient to raise the pH about 0.5 to 1.0 point. Usually the amount of NaOH needed to desorb the primary dispersant is from about 0.0010 part by weight to about 0.0100 part by weight per 100 parts of monomer. More NaOH could be used but it would not serve a useful purpose.

In the preferred process to produce skinless crosslinked resins used in this invention, a charging procedure described below should be used. The procedure used is what is known as a one poly floating method. The free radical catalyst is first mixed with a solvent, such as isopropyl alcohol, in the preferred process. The polymerization reactor charging procedure is explained in the steps below.

(a) Charge water and ion sensitive primary dispersant(s) capable of thickening water to the polymerization vessel. The primary dispersant(s) can be added as such but is preferably added as a concentrated mixture with water. The water and primary dispersant(s) may be premixed before charging to the polymerization vessel. The charge water is preferably demineralized water.

(b) Agitate the water and primary dispersant(s) until an emulsion is formed.

(c) Reduce or stop the agitation such that non-turbulent flow is achieved. (d) Charge the monomer(s) and crosslinking agent to be polymerized to the reactor vessel such that said monomer floats on top of the emulsified, thickened aqueous layer.

(e) Charge a solution comprising a solvent and the free radical catalyst and optionally the secondary dispersant(s) to the reactor. If the secondary dispersant(s) are not combined with the catalyst solution, then they should have been premixed with the monomer before adding to the reactor.

(f) Allow the catalyst solution to diffuse through the monomer layer.

(g) Increase the agitation such that the entire polymerization medium is emulsified.

(h) Conduct the polymerization until 1% to 2% conversion is reached, then add NaOH to desorb the primary dispersant from the monomer droplet.

(i) Continue the polymerization until the desired degree of polymerization is achieved.

The polymer particles produced by the process which gives friable skinless crosslinked PVC described above should have an average diameter by weight greater than about 70 microns. The particles could have an average diameter up to 1000 microns but, normally, the polymer particles will have an average diameter by weight less than about 300 microns. Preferably, for most end uses, the polymer particles will have a diameter in the range of about 100 microns to about 250 microns, most preferably from about 125 microns to about 200 microns. Resins with an average particle size by weight less than 70 microns tend to be dusty and build up static easily such that they are less desirable.

The preferred friable skinless crosslinked PVC particles of this invention are agglomerated, non-spherical in shape. The preferred agitated aqueous suspension processes described above will give an agglomerated non-spherical resin particle. A mass process and the phase inversion process of U.S. Pat. No. 3,706,722 both give more spherical shaped resins than does the preferred agitated aqueous suspension process. A very good method to measure the spherical shape of resins is to determine the shape factor by optical procedures. The image of the particle is projected onto a flat surface to provide a two dimensional view. The shape factor of a particle is determined by inscribing and circumscribing the resin particles flat image with a circle. The ratio of the diameters of the inscribed circle to the circumscribed circle is the number known as the shape factor.

In the case of a perfect circle, the inscribed and circumscribed circles would have the same diameter and, therefore, the shape factor would be unity (1.0). The more near the shape factor is to 1.0 the more spherical the particle. The shape factor of the preferred friable skinless crosslinked PVC particles made by the preferred agitated aqueous suspension process is less than about 0.85, preferably less than about 0.83, and more preferably less than about 0.80. The shape factor of resin particles made by the mass process and the phase inversion process are from about 0.87 to about 0.91.

The preferred friable skinless crosslinked PVC resin particles made by this invention also have high porosities of from about 0.10 cc/g to about 0.8 cc/g as measured using a mercury porosimeter. Preferably, the mercury porosity is from about 0.30 cc/g to about 0.50 cc/g. Porosity is measured according to the ASTM D-2873 procedure. Sometimes porosity is measured as DOP porosity, which gives results about 0.02 cc/g higher than the mercury porosity values reported herein for the same resin. When using a mass process, low conversions of from 35% to 65%, preferably 40% to 50% of monomer to polymer, are used to achieve high porosity.

The preferred friable crosslinked PVC resins used in this invention are skinless. The term skinless as used in this specification means that the resin does not have a continuous pericellular membrane as does a typical PVC resin. There may be discontinuous areas or spots of skin on the resin surface but the resin would still be considered skinless under the meaning used in this invention. The term skinless as used herein includes what is normally referred to as low-skin.

One method to characterize skinless resins is to determine the composition of the surface of the resin particle by use of XPS (ESCA) technique. If a resin was totally skinless, there would not be any primary dispersant on the surface. The surface of the resins of this invention will have less than 40%, preferably less than 25%, and more preferably less than 10%, of the primary dispersant, as measured by ESCA technique. The surface will consist mainly of PVC and secondary surfactants (porosifiers).

The preferred friable crosslinked resin particles of this invention have a surface composition as measured by ESCA greater than about 20% PVC, preferably greater than about 50%, more preferably greater than about 60%. This indicates that the particles have a significant portion of holes in their skin, where said holes allow the plasticizer to easily pass into and be absorbed by the particle. ESCA is an acronym that stands for electron spectroscopy for chemical analysis. The ESCA technique involves irradiating the sample with X-rays from an X-ray tube. The X-rays knock electrons out of the atoms that are on the surface of the sample. The energy and number of these electrons are measured. From that information one can determine what elements are present. The depth of analysis of ESCA is about 20 to 30 angsttoms which is about 5 or 6 monolayers of atoms on the surface of a sample. One should keep in mind that the ESCA test conducts an analysis of the surface visible to the ESCA. In a skinless or low skin resin, pores are open to the surface, therefore the X-rays are going into the pores and the results reflect an analysis of the bottom of the pore as well as the outermost surface of the resin particle. This explains to a great deal why the ESCA analysis of a skinless resin shows the secondary dispersant present. The secondary dispersant is believed to be present on the primary particles which are visible when looking into the pores.

Another method to determine if a resin is skinless is to look at the resin under magnification or take microphotographs of resin particles and observe if a continuous skin or pericellular membrane exists. In a microphotograph, an observer can see into the internal area of the resin particles of this invention. The high porosity, friable particles appear like a sponge with many openings in the surface of the resin paticle. These openings allow for fast plasticizer uptake and create a friable particle which is easily broken down into smaller units (primary particles).

The preferred friable crosslinked skinless resin particles used in this invention also have a fast powder mix time as measured using a torque rheometer according to ASTM D-6373. The resin particles have a powder mix time of less than about 400 seconds, preferably less than 300 seconds, more preferably less than 250 seconds.

It should be recognized that a preferred process has just been described to prepare a friable crosslinked PVC resin. In addition to the skinless resins, which are preferred because of their inherently good friability, one could run a conventional crosslinked PVC process to lower than normal conversions and achieve good friability. Conversions less than about 65% and preferably about 50% give particles with excellent friability while having a skin on the resin.

When making low gloss house siding, the composition contains from about 60 parts to about 99.5 parts by weight of PVC and from about 0.5 parts to about 40 parts by weight of crosslinked PVC, preferably friable crosslinked PVC. The siding will preferably be extruded at a temperature of from about 380° F. to about 410° F. The siding may be extruded as one piece with the above composition or it may be co-extruded as a two piece extrusion having a bottom or base layer and a top or cap layer. In a two piece extrusion the bottom layer could be a conventional rigid PVC composition while the top or cap layer must be a low gloss composition containing the crosslinked PVC. The cap layer is normally much thinner than the base layer. For example, in a house siding the base layer could be about 0.035 inches thick and the top layer could be about 0.010 inches thick.

For articles made by the calendering process, similar compositions as described above for extrusion are used.

When making articles by injection molding, a less friable crosslinked PVC is preferably used. The same proportions of crosslinked PVC to uncrosslinked PVC are used as described above for extrusions.

An important factor to consider in making the desirable matte finish articles of this invention is the smoothness of the surface that one wishes to achieve. Most customers will prefer, or even demand, that the matte surface be very smooth and uniform. Where smoothness is required, a very friable crosslinked resin should be used. The less friable crosslinked resins will not break down during processing and will thus cause undesirable bumps and imperfections on the surface of the article. Also, the amount of crosslinked resin can effect the smoothness of the surface. Normally if levels greater than 40 parts by weight of crosslinked resin are used in the composition, then the surface will be too rough for articles requiring a smooth surface. It should also be recognized that the degree of crosslinking in the crosslinked PVC resin also affects the level required to maintain a smooth surface. The higher the degree of crosslinking in a given resin, the less amount the final composition can tolerate before becoming rough on the surface.

To characterize surface smoothness of a formed article, a subjective visual rating system is used. The surfaces of the articles are rated on a scale from 1 to 10, with 1 being a very rough surface and 10 being an exceptionally smooth surface with only about one bump or imperfection per every 36 square inches of surface area. For articles requiring a smooth surface appearance, such as house siding, the smoothness rating should be 7 or greater. Articles with a smoothness rating of 3 or less will have a rough stucco appearance with an undulating surface of peaks and valleys where the difference in height between the peaks and valleys will be about 1/32 of an inch (0.076 cm) or greater.

Another characteristic of the matte surface articles of this invention is that they have less gloss on their surface. Gloss is normally measured by a gloss meter at 60° angle according to the ASTM D-523 method. A mirror would have a theoretical gloss of 100%, although a perfect 100% is difficult to obtain, articles made from PVC compositions can have gloss values of as high as about 93%. House siding will normally be in the range of from about 60% to about 80% gloss.

The compositions of this invention give a gloss value reduction of at least 10% over the gloss value of the same composition without the crosslinking resin. Preferably, the gloss reduction as measured by the gloss test is greater than 20%, and more preferably the reduction is greater than 30% for compositions containing the crosslinked PVC.

As mentioned earlier, the control of gloss is very important. If a given product can be made within a narrow range of gloss, this is very desirable. On products such as house siding, adjacent pieces of siding should have very near the same gloss, otherwise the non-uniformity is noticeable to the customer. Processing temperatures can greatly affect the gloss of PVC articles. A temperature reduction in the extrusion process of only 5° C. can make a noticeable reduction in gloss. Very often these small temperature changes can occur unintentionally. The compositions of this invention are less sensitive to having temperature affect gloss.

As can be seen from the Figure, at an extrusion temperature of about 395° F., the rate of gloss change per temperature change is very great for the composition having 100 parts by weight of PVC. The gloss change per temperature change is reduced substantially when only 5 parts by weight of crosslinked PVC is added to the composition and there is almost no change when 20 parts by weight of crosslinked PVC is added to the composition. The crosslinked PVC used in the composition of the Figure is a skinless crosslinked PVC having a tan $\delta$ of 0.40. The compositions used in the Figure are shown in Table VI of Example 4 as Runs 14 and 17 along with the control.

The deglossing agents of this invention are very compatible with the compounds base polymer. That is, crosslinked PVC is very compatible with PVC, thus the physical properties of the compounds do not suffer as would be the case when incompatible additives were used to degloss the surface.

The ingredients of the composition of this invention may be mixed by any of the known compounding methods for compounding PVC such as Henschel, mill rolls, Banbury, mixing extruder, and the like. The amount of work applied on the polymers during melt mixing can affect the amount of surface matting achieved. For example, a mixture of PVC and crosslinked PVC which would normally give surface matting could be excessively worked during melt mixing to a point where the two polymers become completely miscible and homogenous therefore eliminating the mixture's ability to create surface matting. Normal work applied during melt mixing will not destroy the matting ability but the degree of matting can be varied by mixing conditions.

The crosslinked PVC may be mixed with the PVC as an additive and compounded with the other ingredients of the composition or the crosslinked PVC may first be mixed into what is commonly referred to in the art as a masterbatch. The masterbatch would normally contain a much higher level of crosslinked PVC than desired in the final composition. For example, if one desired a final composition containing 3 parts by weight of crosslinked PVC, a masterbatch could first be made having 30 parts by weight of crosslinked PVC and then the masterbatch mixed with the PVC composition to give the final composition. The masterbatch can also be metered into an extrusion feed or the feed stream of other forming operations.

The compositions of this invention may be shaped to form useful articles by any of the known methods to form rigid compositions such as calendering, molding, injection blow molding, extrusion blow molding and extrusion. Two particularly useful articles that can be formed from the composition of this invention is a matte finish bottle by either injection blow molding or extrusion blow molding and house siding with a matte surface.

Quite surprisingly, it has been found that bottles molded in smooth mold cavities will exhibit a matte surface appearance when using the compositions of this invention. Although not certain of the scientific principles involved, it is believed that the different viscoelastic properties of the polymers causes the more rubbery (crosslinked PVC) to relax a different amount after forming, thus creating a fine grained roughness on the surface. This surface roughness creates a matte surface effect.

Articles made according to this invention have a satin feel and appearance. The surface roughness is very shallow which makes bottles of this type highly desirable. They do not have a knobby feel as one would get with high peaks of roughness spaced far apart. The peaks and valleys of the roughness are very even and closely spaced.

Another embodiment of this invention is polymeric articles which have a stucco appearance. A stucco appearance is one which has a very rugged appearance characterized by a rough surface with peaks and valleys. The height of the peaks are at least about 1/32 of an inch (0.079 cm), preferably are at least about 1/16 of an inch (0.158 cm), more preferably are at least about ⅛ of an inch (0.317 cm). A surface appearance of about 3 or less is a stucco appearance.

The stucco appearance articles are created by using compositions having high levels of the second polymer, such as crosslinked PVC. When levels of greater than about 40 parts by weight of crosslinked PVC, based on a total of 100 parts by weight of crosslinked PVC and PVC are used in an extrusion operation, the extrudate is very rough and exhibits a stucco appearance. A stucco appearance can be achieved by using lower than 40 parts by weight of crosslinked PVC, if the crosslinked PVC is very highly crosslinked. Also, formulation changes, such as types and amounts of lubricants, as well as extrusion conditions are believed to affect the amount of crosslinked PVC needed to cause a stucco appearance.

The stucco appearance articles are useful for siding, ceiling tile or decorative panels for use in the interior or exterior of buildings. When used as a decorative ceiling tile, they are also very functional since they do not discolor when exposed to water as does the conventional paper composite ceiling tile.

Wherever used in this specification, including the Examples, the term "parts" or "parts by weight" means parts by weight per 100 parts by weight of total PVC polymer, including crosslinked PVC and conventional PVC, unless otherwise stated.

To further illustrate the present invention, the following specific examples are given, it being understood that this is merely intended in an illustrative and not a limitative sense. In the examples, all parts and percents are by weight unless otherwise indicated.

EXAMPLE 1

This Example is presented to demonstrate a process to produce a crosslinked resin suitable for use in this invention. An 1100 gallon reactor equipped with agitation and cooling means was used in this Example. The following polymerization recipe was used:

TABLE II

| Ingredient | Parts by Wt. |
|---|---|
| Vinyl Chloride | 100 |
| Water (demineralized) | 150 |
| Diallyl phthalate | 0.260 |
| Polyacrylic Acid Dispersant | 0.025 |
| NaOH | 0.0025 |
| Isopropyl Alcohol | 0.120 |
| Low Hydrolysis (55%) PVA | 0.300 |
| 2-ethyl Hexyl Peroxydicarbonate | 0.045 |
| Phenolic Shortstop | 0.020 |

The ingredients were charged according to the two poly method disclosed in U.S. Pat. No. 4,668,707. The reaction was conducted at 53° C. The NaOH was charged as a solution in water after 15 minutes into the reaction (about 1% conversion). At 275 minutes the reaction was terminated with the phenolic shortstop. The resin was removed from the reactor, stripped of residual monomer and dried to a free flowing powder.

The resin particles were agglomerated, irregularly shaped, porous, crosslinked resin particles which were absent a continuous skin with the following properties:

| | |
|---|---|
| Weight average particle size | 160 microns |
| Mercury porosity | 0.407 cc/gm |
| Powder mix time | 216 seconds |
| Complex viscosity | $20 \times 10^5$ poise |
| Tan δ | 0.5 |

This example demonstrates a crosslinked resin suitable for use in this invention. The tan δ indicates a significant amount of crosslinking. The amount of crosslinking can be varied by the level of crosslinking agent (diallyl phthalate) in the polymerization recipe.

EXAMPLE 2

This Example is presented to show the degree of gloss control, as measured by a gloss meter (60°), and the smoothness ratings of various rigid PVC compositions containing high molecular weight PVC resins. The same base composition was used in all runs, the only difference being the amount of and the type of second polymer that was added. Three different high molecular weight second polymers were used at three different levels (5, 10 and 20 parts by weight).

The base formulation is given in the following Table III:

TABLE III

| Ingredient | Parts by Weight |
|---|---|
| First Polymer[1] | 100 - X (variable) |
| Second Polymer (variable) | X |
| Tin stabilizer | 1.4 |
| TiO$_2$ | 10.0 |
| Impact Modifier | 5.0 |
| Processing Aids and Lubricants | 4.3 |

[1]PVC homopolymer (uncrosslinked) having an IV of 0.92.

A description of the various second polymers is shown below:

Second Polymer No. 1—is an uncrosslinked high molecular weight PVC homopolymer having an IV of 1.4 and made by a conventional suspension PVC process;

Second Polymer No. 2—is a skinless high molecular weight uncrosslinked PVC homopolymer having an IV of 1.4 and made by a skinless suspension PVC process;

Second Polymer No. 3—is an uncrosslinked very high molecular weight PVC homopolymer having an IV of 2.0 and made by a conventional suspension PVC process;

The formulations of Table III were mixed as a powder mix and extruded from a Brabender extruder, 2:1 screw, 50 RPM and a 4 inch die. The type and amount of the second polymer used in the formulations together with the gloss rating and surface smoothness are shown in the following Table IV:

TABLE IV

| Ingredient | Run Control | 1 | 2 | 3 | 4 | 5 | 6 | 7 | 8 | 9 |
|---|---|---|---|---|---|---|---|---|---|---|
| First Polymer | 100 | 95 | 95 | 95 | 90 | 90 | 90 | 80 | 80 | 80 |
| Second Polymer No. 1 | — | 5 | — | — | 10 | — | — | 20 | — | — |
| Second Polymer No. 2 | — | — | 5 | — | — | 10 | — | — | 20 | — |
| Second Polymer No. 3 | — | — | — | 5 | — | — | 10 | — | — | 20 |
| % gloss | 76 | 27 | 30 | 22 | 18 | 19 | 12 | 10 | 15 | 7 |
| Surface Smoothness | 8.5 | 4 | 4 | 4 | 4 | 4 | 4 | 3.5 | 4 | 4 |

The data in Table IV shows that all of the high molecular weight second polymers had a deglossing effect on the formulations, however, as can be seen, the surface smoothness was not adequate for articles demanding a smooth surface such as house siding. The lack of surface smoothness in all of the runs was a result of insufficient temperature during the extrusion process. This points out that by running a lower extrusion temperature, less gloss can be achieved but the surface smoothness is not satisfactory.

The data in Table IV also shows that the 2.0 IV resin (Runs 3, 6 and 9) gives more gloss reduction than does the 1.4 IV resin.

EXAMPLE 3

In this Example the same formulations were used as in Example II, except that instead of extruding directly from a powder mix, the formulations were first made into cubes by first processing on a two roll mill and then cubing and the cubes were fed to the Brabender extruder. When a PVC compound is first made into cubes and then extruded, there has been considerably more work and shear applied to the PVC resin particles. In this Example the second polymer was used at a level of 10 parts by weight. The following Table V shows the formulations and results:

TABLE V

| Ingredient | Run | 10 | 11 | 12 |
|---|---|---|---|---|
| First Polymer | | 90 | 90 | 90 |
| Second Polymer No. 1 | | 10 | — | — |
| Second Polymer No. 2 | | — | 10 | — |

TABLE V-continued

| Ingredient | Run | Parts by Weight | | |
|---|---|---|---|---|
| | | 10 | 11 | 12 |
| Second Polymer No. 3 | | — | — | 10 |
| % gloss | | 52 | 58 | 27 |
| Surface Smoothness | | 8 | 8 | 9.5 |

As can be seen from the results of Table V, the surface smoothness is much higher for all of the compositions. A composition with low gloss and smooth surface is found in Run 12 which uses Second Polymer No. 3 which is a high molecular weight (2.0 IV) PVC. The 1.4 IV PVC in Runs 10 and 11 showed much lower gloss than the control of Example 2 but less reduction in gloss than the 2.0 IV resin. Gloss could be reduced further with either of the second polymers by using higher levels but at some point the surface would become unacceptably rough for most end use applications.

EXAMPLE 4

This Example is presented to demonstrate the effectiveness of crosslinked PVC as a deglossing agent in rigid PVC formulations. Three different crosslinked PVC's were evaluated at two levels (5 and 20 parts by weight). The three crosslinked PVC resins used as the second polymer are as follows:

Second polymer No. 4 is a crosslinked PVC homopolymer having a friability of 3, a tan δ of about 0.34 and made by a conventional suspension PVC process; Second polymer No. 5 is a skinless crosslinked PVC homopolymer having a friability of 0, a tan δ of about 0.40 and made by a skinless suspension PVC process; Second polymer No. 6 is a skinless crosslinked PVC homopolymer having a friability of 0, a tan δ of about 0.56 and made by a skinless suspension PVC process.

The formulations were powder mixed and extruded on a twin screw extruder into house siding. Three different extrusion temperatures were used for each compound (370° F., 390° F. and 410° F.). The formulations used were the same as used in Example 2 except that the second polymer was different. The formulations used and results obtained are shown in Table VI.

TABLE VI

| Ingredient | Run | Control | Parts by Weight | | | | | |
|---|---|---|---|---|---|---|---|---|
| | | | 13 | 14 | 15 | 16 | 17 | 18 |
| First Polymer[1] | | 100 | 95 | 95 | 95 | 80 | 80 | 80 |
| Tin Stabilizer | | 1.4 | 1.4 | 1.4 | 1.4 | 1.4 | 1.4 | 1.4 |
| TiO$_2$ | | 10.0 | 10.0 | 10.0 | 10.0 | 10.0 | 10.0 | 10.0 |
| Impact Modifiers | | 5.0 | 5.0 | 5.0 | 5.0 | 5.0 | 5.0 | 5.0 |
| Processing Aids & Lubricants | | 4.3 | 4.3 | 4.3 | 4.3 | 4.3 | 4.3 | 4.3 |
| Second Polymer No. 4 | | — | 5 | — | — | 20 | — | — |
| Second Polymer No. 5 | | — | — | 5 | — | — | 20 | — |
| Second Polymer No. 6 | | — | — | — | 5 | — | — | 20 |
| % gloss | | | | | | | | |
| at 370° F. | | 4.5 | 3 | 3.5 | 4 | 2.5 | 3 | 3.5 |
| at 390° F. | | 10 | N.R. | N.R. | 6.5 | N.R. | N.R. | 4.0 |
| at 410° F. | | 45 | 13 | 14 | 24 | 4 | 4 | 5.0 |
| Surface Smoothness | | | | | | | | |
| at 370° F. | | 9.5 | 5.5 | 8 | 9.5 | 3.5 | 5 | 8.5 |
| at 390° F. | | 10 | N.R. | N.R. | 10 | N.R. | N.R. | 8.5 |
| at 410° F. | | 10 | 5 | 7 | 9.5 | 4.3 | 4.5 | 7.5 |

[1]Same as First Polymer In Example 2
N.R. = No reading taken at this temperature From the data in Table VI, it can be seen that increasing extrusion temperature increases gloss and surface smoothness. Also, as the level of any of the crosslinked PVC resins was increased, the gloss decreased, but the surface became rougher. When comparing the different crosslinked resins (Second Polymers) it is shown that the more friable skinless crosslinked resins (Second Polymers No. 5 and 6) give a higher surface smoothness at all three extrusion temperatures. Second Polymer No. 6 gave the preferred properties of surface smoothness equivalent to the control while reducing gloss considerably from the control. The less friable crosslinked PVC made by the conventional suspension process (second Polymer No. 4), although giving large gloss reduction had a surface smoothness value which would be unacceptable for house siding.

EXAMPLE 5

This Example is presented to show that articles having a stucco appearance can be made according to this invention. In this Example, a stucco house siding was produced as in Example 4 using a rigid PVC formulation in a twin screw extrusion. Three different crosslinked PVC polymers were used as the second polymer in a PVC formulation. Second Polymers No. 4, No. 5 and No. 6 as described in Example 4, were used in the stucco formulation of this Example. The formulations used and results obtained are shown in Table VII.

TABLE VII

| Ingredient | Run | Control | Parts by Weight | | | | | |
|---|---|---|---|---|---|---|---|---|
| | | | 19 | 20 | 21 | 22 | 23 | 24 |
| First Polymer[1] | | 100 | 50 | — | 50 | — | 50 | — |
| Tin Stabilizer | | 1.4 | 1.4 | 1.4 | 1.4 | 1.4 | 1.4 | 1.4 |
| TiO$_2$ | | 10.0 | 10.0 | 10.0 | 10.0 | 10.0 | 10.0 | 10.0 |
| Impact Modifiers | | 5.0 | 5.0 | 5.0 | 5.0 | 5.0 | 5.0 | 5.0 |
| Processing Aids & Lubricants | | 4.3 | 4.3 | 4.3 | 4.3 | 4.3 | 4.3 | 4.3 |
| Second Polymer No. 4 | | — | 50 | 100 | — | — | — | — |
| Second Polymer No. 5 | | — | — | — | 50 | 100 | — | — |
| Second Polymer No. 6 | | — | — | — | — | — | 50 | 100 |
| % gloss | | | | | | | | |

TABLE VII-continued

| Ingredient | Run Control | Parts by Weight | | | | | |
|---|---|---|---|---|---|---|---|
| | | 19 | 20 | 21 | 22 | 23 | 24 |
| at 390° F. | 13 | 2.5 | — | 3 | — | 3 | 2 |
| at 410° F. | 45 | 2 | — | 1.5 | — | 2.5 | 2 |
| Surface Smoothness | | | | | | | |
| at 390° F. | 10 | 2 | — | 2.5 | — | 2.3 | 1.3 |
| at 410° F. | 8.5 | 1 | — | 1 | — | 1.3 | 0.4 |

[1]Same First Polymer as in Examples 2 and 4

The above data shows that at the 50 parts by weight level all three of the crosslinked PVC resins gave a stucco appearance (very rough surface). Runs 20 and 22, which had 100 parts by weight of crosslinked PVC, were too rough to be extruded, therefore, no data was taken. The lightly crosslinked skinless crosslinked PVC (Run 24) could be extruded even at the 100 parts by weight level.

The stucco appearing surface had random peaks and valleys on the surface which were up to ¼ inch high.

EXAMPLE 6

This Example is presented to show that crosslinked PVC produced by the mass process can be used to degloss a rigid PVC formulation. Formulations similar to those of Example 5 were compounded and extruded into house siding using a twin screw extruder. The crosslinked mass resins (second Polymer No. 7 and second Polymer No. 8) used as deglossing agents were crosslinked with 0.4 parts and 0.25 parts by weight respectively per one hundred parts by weight of vinyl monomers of diallyl phathalate and the resins had a tan δ of 0.63 and 0.73, respectively. The formulations and results are shown in Table VIII.

TABLE VIII

| Ingredient | Run Control | Parts by Weight | |
|---|---|---|---|
| | | 25 | 26 |
| First Polymer[1] | 100 | 80 | 80 |
| Tin Stabilizer | 1.4 | 1.4 | 1.4 |
| TiO2 | 10 | 10 | 10 |
| Impact Modifiers | 5 | 5 | 5 |
| Processing Aids & Lubricants | 4.3 | 4.3 | 4.3 |
| Second Polymer No. 7 | — | 20 | — |
| Second Polymer No. 8 | — | — | 20 |
| % gloss | | | |
| at 390° F. | 12 | 3.5 | 4.5 |
| at 420° F. | 55 | 3.0 | 8.5 |
| Surface Smoothness | | | |
| at 390° F. | 10 | 6.5 | 7.25 |
| at 420° F. | 10 | 3.5 | 7.25 |

The data in Table VIII shows that 20 parts by weight of mass crosslinked PVC will effectively degloss a rigid PVC siding formulation. Also, it is shown that the lighter crosslinked Second Polymer No. 8 gives a smoother surface.

EXAMPLE 7

This Example is presented to show that crosslinked PVC resins can be used as deglossing agents for rigid PVC injection molding formulations. Also, this Example shows that the preferred crosslinked resin for use in injection molding applications is a less friable conventional crosslinked PVC as opposed to the more highly friable skinless crosslinked PVC. Three different crosslinked PVC polymers (Second Polymers No. 4, No. 5 and No. 6) were evaluated at the 10, 20 and 100 parts by weight level. Second Polymers No. 4, No. 5 and No. 6 are described in Example 4. The formulations and results are shown in Table IX. All compositions were injection molded on a 75 ton Van Dorn reciprocating screw injection molding machine. Compositions were injected into an ASTM mold which was highly polished metal.

TABLE IX

| Ingredient | Run Control | Parts by Weight | | | | | | | | |
|---|---|---|---|---|---|---|---|---|---|---|
| | | 27 | 28 | 29 | 30 | 31 | 32 | 33 | 34 | 35 |
| First Polymer[2] | 100 | 90 | 90 | 90 | 80 | 80 | 80 | — | — | — |
| Second Polymer No. 4 | — | 10 | — | — | 20 | — | — | 100 | — | — |
| Second Polymer No. 5 | — | — | 10 | — | — | 20 | — | — | 100 | — |
| Second Polymer No. 6 | — | — | — | 10 | — | — | 20 | — | — | 100 |
| Tin Stabilizer | 1.2 | 1.5 | 1.5 | 1.5 | 1.5 | 1.5 | 1.5 | 3.0 | 3.0 | 3.0 |
| Fillers | 6.5 | 6.5 | 6.5 | 6.5 | 6.5 | 6.5 | 6.5 | 6.5 | 6.5 | 6.5 |
| Lubricants & Processing Aids | 6.6 | 6.6 | 6.6 | 6.6 | 6.6 | 6.6 | 6.6 | 7.5 | 7.5 | 7.5 |
| % gloss | 83 | 35 | 54 | 71 | 28 | 32 | 61 | — | — | 35 |
| Surface Uniformity | 10 | 9 | 7.5 | 7.5 | 8 | 7 | 7 | — | — | 3 |

0 = bad
10 = excellent
[2]Mass produced PVC homopolymer having an IV of 0.68

The data above shows that Second Polymer No. 4 gives higher amounts of deglossing while maintaining a high degree of surface uniformity (Runs 27 and 30). Runs 33 and 34 decomposed during molding and therefore were unsatisfactory for use in injection molding.

We claim:

1. A process for producing a rigid thermoplastic article having a stucco appearance comprising an uneven surface of a random array of peaks and valleys wherein the difference in height of said peaks and valleys is at least about 0.079 centimeters, said process comprising forming an extrusion from a composition consisting essentially of a blend of different resin particles, the blend comprising a first resin polymer, a second resin polymer and less than 5 parts by weight of plasticizer per 100 weight parts total of said first and said second resin polymer s, said first and said second resin polymer s have different viscoeleastic properties, said first polymer is polyvinyl chloride and said second polymer is crosslinked polyvinyl chloride and said crosslinked polyvinyl chloride is present at a level of at least 40 parts by weight per 100 parts by weight total of said first and said second resin polymers.

2. A process of claim 1 wherein said article is selected from the group consisting of house siding, pipe, rigid profiles, and ceiling tile.

3. A process of claim 1 wherein the height of said peaks is at least about 0.158 centimeters.

* * * * *